United States Patent
Baek et al.

(10) Patent No.: US 7,873,003 B2
(45) Date of Patent: Jan. 18, 2011

(54) METHOD FOR ALLOCATING IP ADDRESS TO MOBILE STATION IN MOBILE COMMUNICATION SYSTEM

(75) Inventors: Seung-Kwon Baek, Daejon (KR); Yeon-Seung Shin, Daejon (KR); Yeong-Jin Kim, Daejon (KR)

(73) Assignees: Electronics and Telecommunications Research Institute, Daejeon (KR); KTFREETEL Co., Ltd., Seoul (KR)

( * ) Notice: Subject to any disclaimer, the term of this patent is extended or adjusted under 35 U.S.C. 154(b) by 703 days.

(21) Appl. No.: 11/930,949

(22) Filed: Oct. 31, 2007

(65) Prior Publication Data
US 2008/0107067 A1 May 8, 2008

(30) Foreign Application Priority Data
Nov. 8, 2006 (KR) ...................... 10-2006-0110115
Oct. 9, 2007 (KR) ...................... 10-2007-0101670

(51) Int. Cl.
H04W 4/00 (2009.01)
(52) U.S. Cl. .................................. 370/329; 370/395.52
(58) Field of Classification Search ......... 370/328–339, 370/392, 395.5, 395.52, 395.4
See application file for complete search history.

(56) References Cited

U.S. PATENT DOCUMENTS

| 2003/0026230 | A1* | 2/2003 | Ibanez et al. | 370/338 |
| 2005/0271032 | A1* | 12/2005 | Yun et al. | 370/349 |
| 2005/0271034 | A1* | 12/2005 | Asokan et al. | 370/349 |
| 2007/0268919 | A1* | 11/2007 | Sarikaya et al. | 370/401 |

FOREIGN PATENT DOCUMENTS

| JP | 2001-326697 | 11/2001 |
| KR | 1020020054220 | 7/2002 |
| KR | 10-2005-0107850 | 11/2005 |
| KR | 10-2005-0122208 | 12/2005 |
| KR | 1020060004869 | 1/2006 |
| WO | 03/081856 | 10/2003 |

OTHER PUBLICATIONS

Yoo et al, IPv6 in 3GPP networks satisfying IETF's recommendations, Internet Draft, 21 pages, Oct. 2003.*
Chen et al.*, "IP Connectivity for Gateway GPRS Support Node"; IEEE Wireless Communications; 2005; pp. 37-45.
European Search Report for patent app. 07120131.3-2413.
Notice of Allowance dated Jul. 8, 2009, for Korean application No. 10-2007-0101670, citing the above references.

* cited by examiner

*Primary Examiner*—Frank Duong
(74) *Attorney, Agent, or Firm*—Lowe Hauptman Ham & Berner LLP (57) ABSTRACT

Provided is a method for allocating an Internet protocol (IP) address to a mobile station in a mobile communication system. The method includes the steps of: a) receiving an "Activate Packet Data Protocol (PDP) request" message including router solicitation from the mobile station; b) acquiring a global IP address of the mobile station by performing the router solicitation and a router advertisement procedure instead of the mobile station; and c) loading the acquired global IP address in an "Activate PDP context Accept" message and transferring the "Activate PDP context Accept" message to the mobile station.

18 Claims, 9 Drawing Sheets

<Activate PDP Context Request>

| Projection Identifier | Protocol Discriminator |
|---|---|
| Message type ||
| Requested NSAPI ||
| Requested LLC SAPI ||
| Requested QoS ||
| Requested address ||
| APN ||
| Protocol configuration option (PCO) ||

<Activate PDP Context Accept>

| Projection Identifier | Protocol Discriminator |
|---|---|
| Message type ||
| Negotiated LLC SAPI ||
| Negotiated QoS ||
| Spare | Radio Priority |
| Protocol configuration option (PCO) ||
| Packet Flow Identifier ||

<Router Solicitation(RFC2461)>

| 0 | 1 | 2 | 3 | 4 |

| Type=133 | Code=0 | Checksum |
|---|---|---|
| Reserved | | |
| Option (Source Link-layer Address) | | |

FIG. 7B

<Router Advertisement(RFC2461)>

| 0 | 1 | 2 | 3 | 4 |

| Type=134 | Code=0 | | Checksum |
|---|---|---|---|
| Cur Hop Limit | M | 0 Reserved | Router Life Time |
| Reachable Time | | | |
| Retrans Timer | | | |
| Option (Source Link-layer Address) | | | |
| Prefix Information | | | |

~70

M: Indication of using stateful address configuration method (1 bit)
0: Use stateful address configuration method to acquire information except address

<PCO IE of PDP Context Activation Request message>

FIG. 9B

<PCO IE of PDP Context Activation Accept message>

METHOD FOR ALLOCATING IP ADDRESS TO MOBILE STATION IN MOBILE COMMUNICATION SYSTEM

CROSS-REFERENCE(S) TO RELATED APPLICATIONS

The present invention claims priority of Korean Patent Application Nos. 10-2006-0110115 and 10-2007-0101670, filed on Nov. 8, 2006, and Oct. 9, 2007, respectively, which are incorporated herein by reference.

BACKGROUND OF THE INVENTION

1. Field of the Invention

The present invention relates to a method for allocating an Internet protocol (IP) address to a mobile station in a mobile communication system; and, more particularly, to an IP address allocating method which can quickly allocate an IP address and improve efficiency of radio resources application by simplifying an address allocating procedure by cooperating with a session management protocol procedure and dynamically allocating the IP address to the mobile station in an IP based-mobile communication system.

This work was supported by the IT R&D program for MIC/IITA. [2005-S-404-22, "Research and development on 3G long-term evolution access system"].

2. Description of Related Art

Currently, a standard on a passive Internet Protocol Version 6 (IPv6) address allocating method and a dynamic IPv6 address allocating method is described as a method for allocating an IPv6 address to a mobile station in a 3rd Generation Partnership Project (3GPP) Release 6. The passive address allocating method is a method for allocating an IPv6 prefix by a provider in subscribing a mobile station. The dynamic address allocating method is a method for allocating an IPv6 address to the mobile station in a packet data protocol (PDP) activation procedure, i.e., a session management procedure. Stateless address auto-configuration and stateful address auto-configuration methods are suggested in the 3GPP in order to allocate a dynamic IPv6 address of the method described above.

When IPv6 address auto-configuration is applied, a signal procedure performed by an internet service provider (ISP) is divided into two steps. A first step is a signal procedure using a control plane of a mobile communication system. A second step is a signal procedure using a user plane. The signal procedure of the first step means a PDP context activation procedure by a session management protocol. The signal procedure of the second step is a signal procedure by an Internet protocol such as Internet control message protocol (ICMP). As described above, the signal procedure by the Internet protocol may be divided into the stateless auto-configuration procedure and the stateful auto-configuration procedure.

The stateless auto-configuration procedure is a method for allocating the IPv6 address through cooperation between a mobile station and a gateway of a core network, e.g., a gateway General Packet Radio Service (GPRS) support node (GGSN) in 3GPP. In the stateless auto-configuration procedure, when a prefix part of the IPv6 address is transferred to the mobile station, the mobile station configures an IPv6 address by combining the received prefix part and the interface identification (interface-ID). In comparison, the stateful auto-configuration procedure is an IPv6 address allocating method through cooperation among a mobile station, a gateway of a core network, and a dynamic host configuration protocol (DHCP) server of an Internet service provider (ISP). The current 3GPP adopts the stateless auto-configuration method as a mandatory method and the stateful auto-configuration method as an optional method.

Figure 1:
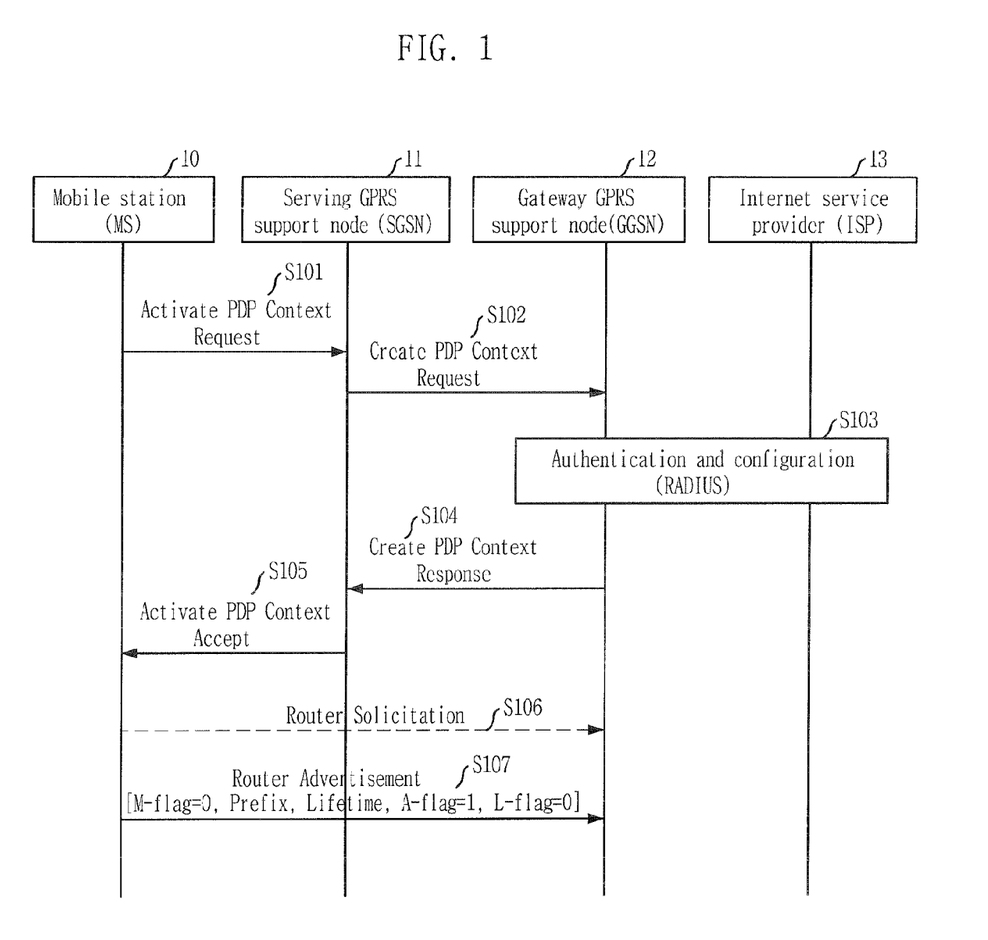
FIG. 1 is a flowchart describing a stateless address auto-configuration method in a conventional mobile communication system, e.g., 3rd Generation Partnership Project (3GPP).
Figure 2:
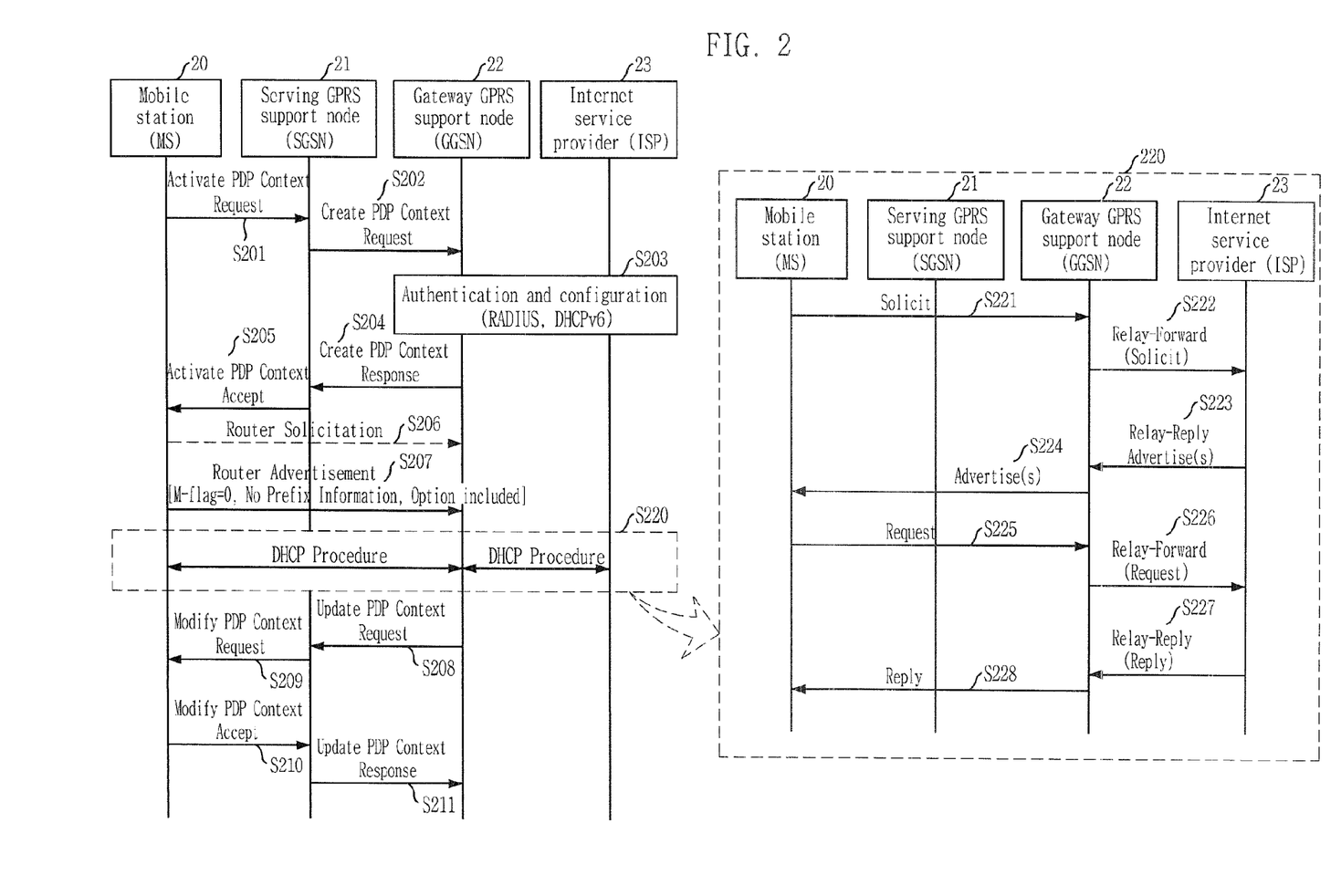
FIG. 2 is a flowchart describing a stateful IPv6 address allocating method in the conventional mobile communication system such as the 3GPP.

FIGS. 1 and 2 are diagrams illustrating an IPv6 address auto-configuration procedure suggested in a conventional 3GPP standard. FIGS. 1 and 2 show the IPv6 address auto-configuration procedure through a signaling procedure performed among a mobile station (MS) including a terminal equipment (TE) and an equipment (UE), a serving GPRS support node (SGSN)/gateway GPRS support node (GGSN) existing on a core network, and an Internet service provider (ISP). Each of FIGS. 1 and 2 will be described hereinafter.

FIG. 1 is a flowchart describing the stateless address auto-configuration method in the conventional mobile communication system, e.g., 3GPP.

A mobile station 10 accessing to a mobile communication network transfers an "Activate PDP Context Request" message to an SGSN 11 to dynamically receive an IPv6 address as one of a session management (SM) protocol procedure at step S101.

The "Activate PDP Context Request" message is a message for activating a PDP context and configuring a service session between the mobile station and the core network. The "Activate PDP Context Request" message includes parameters such as Access Point Name (APN), Quality of Service (QoS), Network Service Access Point Identifier (NSAPI), an Internet Protocol (IP) address and cooperation protocol, and a Protocol Configuration Option (PCO) for a service (see FIG. 6A).

In particular, when it is requested to allocate a dynamic IPv6 address, the mobile station 10 configures a PDP address IE of the message as "0" and transfers the PDP address IE to the SGSN 11. The SGSN 11 receiving the message creates and transfers a "Create PDP Context Request" message to a GGSN 12 at step S102.

The GGSN 12 receiving the "Create PDP Context Request" message divides the IPv6 address allocating method as a stateless address allocating method and a stateful address allocating method, cooperates with a Remote Authentication Dial-In User Service (RADIUS) server, which is an authentication server provided by the ISP, and allocates a prefix and an interface-ID using a prefix pool of the GGSN 12 at step S103. The interface-ID created in the GGSN 12 should be different from the interface-ID of the mobile station. The prefixes allocated to each mobile station should be differently allocated. The prefix allocated to the mobile station is created by the GGSN 12 through cooperation with external authentication server, i.e., an Authentication, Authorization, and Accounting (AAA) server.

The GGSN 12 performing the procedure creates a "Create PDP Context Response" message including an IPv6 address formed of a prefix and an interface-ID and transfers the "Create PDP Context Response" message to the SGSN 11 at step S104. The SGSN 11 receiving the "Create PDP Context Response" message stores the IPv6 address and transfers the "Activate PDP Context Accept" message (see FIG. 6B) to the mobile station 10 at step S105.

The mobile station 10 receiving the "Activate PDP Context Accept" message recognizes that a signal procedure of a control plane is completed, extracts the interface-ID from the received "Activate PDP Context Accept" message, and performs an IPv6 address auto-configuration procedure using the interface-ID extracted from the user plane or the interface-ID created by the mobile station 10.

The signal procedure of the user plane, i.e., an IPv6 address auto-configuration procedure, will be described in detail hereinafter. The mobile station 10 configures a link local address based on the interface-ID transmitted from the GGSN 12 or the interface-ID created by the mobile station 10, and transfers a "Router Solicitation" message (see FIG. 7A) to the GGSN 12 performing a router function at step S106.

The GGSN 12 periodically transfers a "Router Advertisement" message to the mobile station 10 corresponding to a response message with respect to the "Router Solicitation" message at step S107. In the "Router Advertisement" message, an M-flag and an L-flag are configured as "0" in order to notify that the procedure is the stateless auto-configuration procedure, and the prefix, the lifetime and the A-flag are included (Refer to FIG. 7B).

The mobile station 10 receiving the "Router Advertisement" message creates a global IPv6 address based on the interface-ID received through the step S105 or the interface-ID created by the mobile station 10, and the prefix received through the step S107.

FIG. 2 is a flowchart describing a stateful IPv6 address allocating method in a conventional mobile communication system such as the 3GPP.

The mobile station 20 accessing to a mobile communication network transfers the "Activate PDP Context Request" message to an SGSN 21 as a session management (SM) protocol procedure in order to dynamically receive an IPv6 address at step S201. The "Activate PDP Context Request" message is a message for activating a PDP context and configuring a service session between the mobile station and the core network. The "Activate PDP Context Request" message includes parameters such as Access Point Name (APN), Quality of Service (QoS), NSAPI, an IP address and cooperation protocol, and Protocol Configuration Option (PCO) for a service.

In particular, when the mobile station 20 requests dynamic IPv6 address allocation, a PDIP address IE of the message is configured as "0" and transferred to the SGSN 21. The SGSN 21 receiving the message creates and transfers the "Create PDP Context Request" message to a GGSN 22 at step S202.

The GGSN 22 receiving the "Create PDP Context Request" message recognizes the IPv6 address allocating method as a stateless address allocating method and a stateful address allocating method, and cooperates with the RADIUS server, which is an authentication server provided by the ISP. Also, the GGSN 22 allocates the prefix and the interface-ID through own prefix pool or through cooperation with own DHCP server at step S203. The interface-ID created in the GGSN 22 should be different from the interface-ID of the mobile station (MS) and a link local prefix such as FE80::/64 is used as a prefix.

The GGSN 22 performing the above procedure creates a "Create PDP Context Response" message including the IPv6 address formed of the prefix and the interface-ID, and transfers the "Create PDP Context Response" message to the SGSN 21 at step 204. The SGSN 21 receiving the message stores the IPv6 address and transfers the "Activate PDP Context Accept" message to the mobile station 20 at step S205.

The mobile station 20 receiving the "Activate PDP Context Accept" message recognizes that a signal procedure of a control plane is completed, extracts the interface-ID from the received "Activate PDP Context Accept" message, and performs an IPv6 auto configuration procedure based on the interface-ID extracted from the user plane or the interface-ID created by the mobile station 20.

The signal procedure of the user plane, i.e., the IPv6 auto configuration procedure will be described in detail as follows. The mobile station 20 configures a link local address based on the interface-ID received from the GGSN 22 and transfers the "Router Solicitation" message to the GGSN 22 performing a router function at step S206.

The GGSN 22 periodically transfers a "Router Advertisement" message to the mobile station 20 corresponding to the response message with respect to the "Router Solicitation" message at step S207. In the "Router Advertisement" message, the M-flag is configured as "1" in order to notify that the procedure is the stateful address auto-configuration procedure, but the prefix is not included differently from the case of FIG. 1.

The mobile station 20 receiving the "Router Advertisement" message receives a stateful IPv6 address by performing a Dynamic Host Configuration Protocol (DHCPv6) procedure following RFC 3315 through cooperation with the DHCP server of the ISP at step S220.

When the DHCPv6 procedure is performed, the GGSN 22 transmits/receives a message by performing a DHCP relay function between the mobile station and a DHCP server. In the DHCPv6 procedure, the mobile station 20 transfers a "Solicit" message to the GGSN 22 in order to find a DHCP server at step S221. The GGSN 22 receiving the "Solicit" message transfers a "Relay-Forward" message to the DHCP server at step S222.

When the DHCP server receiving the "Relay-Forward" message transfers a "Reply" message including an IP address of the DHCP server to the GGSN 22 as a response message with respect to the message at step S223, the GGSN 22 transfers the "Advertisement" message included in the "Relay" message to the mobile station 20 at step S224.

The mobile station 20 receiving the "Advertisement" message selects the DHCP server and transfers a "Request" message to the GGSN 22 in order to request an IP address at step S225. The GGSN 22 receiving the message transfers a "Relay-Forward" message to the DHCP server at step S226.

The DHCP server receiving the "Relay-Forward" message transfers a "Relay-Reply" message including the IP address of the requested mobile station to the GGSN 22 at step S227. The GGSN 22 receiving the message transfers a "Reply" message to the mobile station 20 at step S228.

The GGSN 22 transfers the "Reply" message to the mobile station 20 at step S228 and performs a PDP modification procedure to configure a certified IPv6Aaddress for the mobile station 20. The above procedure will be described in detail as follows.

When the GGSN 22 transfers an "Update PDP Context Request" message to the SGSN 21 at step S208. The SGSN 21 receiving the "Update PDP Context Request" message transfers a "Modify PDP Context Request" message to the mobile station 20 at step S209.

The mobile station 20 transfers a "Modify PDP Context Accept" message to the SGSN 21 as a response to the "Modify PDP Context Request" message at step S210. The SGSN 21 receiving the "Modify PDP Context Accept" message transfers an "Update PDP Context Response" message to the GGSN 22 at step S211. Accordingly, the PDP modification procedure ends and a stateful IPv6 address allocation procedure of the mobile station ends.

In the conventional mobile communication system, an IPv6 address allocating procedure is performed to allocate an IPv6 address through a configuration procedure of a control plane by signaling and through cooperation between a plurality of function nodes, e.g., GGSN/SGSN, on the mobile station and the core network, and a signaling procedure of an IPv6 based user plane.

In the IPv6 address allocating method through the conventional two-steps message exchanging procedure, many delays may occur in initial IP configuration of the mobile station due to a complex signal exchange procedure. Also, there is a problem that flexibility of the service is not secured in case that handover on the mobile station is performed to a region included in another domain.

When a plurality of signal procedures such as the conventional IPv6 address allocating method are performed, resource efficiency is low in a mobile communication system using limited radio resources. Also, the mobile communication system is not proper to a target of minimizing the delay of the control plane in the currently standardized 3GPP Evolution system.

SUMMARY OF THE INVENTION

In a conventional technology described above, a session configuration procedure of a control plane and a procedure of a user plane are divided and an Internet Protocol (IP) address is allocated through a multi-step s message exchange procedure. Accordingly, the conventional technology delays IP address acquisition of the mobile station (MS) and wastes radio resources by doubly using radio section resources. An object of the present invention is to solve the above problems.

An embodiment of the present invention is directed to providing an IP address allocating method which can quickly allocate an IP address and improve efficiency of radio resources application by simplifying an address allocating procedure by cooperating with a session management protocol procedure and dynamically allocating the IP address to the mobile station in an IP based-mobile communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

To solve the above problem, the present invention allocates an Internet Protocol (IP) address by cooperating a session configuration procedure of the control plane and an address allocation procedure of the user plane.

That is, when the present invention allocates the IP address, e.g., an Internet Protocol Version 6 (IPv6) address, to the mobile station in an IP based mobile communication system, e.g., a 3rd Generation Partnership Project (3GPP) evolution system, the present invention dynamically allocates the IP address by cooperating with a session management protocol procedure.

In accordance with an aspect of the present invention, there is provided method for allocating a stateless dynamic Internet protocol (IP) address to a mobile station in an IP based mobile communication system, including the steps of: a) receiving an "Activate Packet Data Protocol (PDP) request" message including router solicitation from the mobile station; b) acquiring a global IP address of the mobile station by performing the router solicitation and a router advertisement procedure instead of the mobile station; and c) loading the acquired global IP address in an "Activate PDP context Accept" message and transferring the "Activate PDP context Accept" message to the mobile station.

In accordance with another aspect of the present invention, there is provided a method for allocating a stateful dynamic IP address to a mobile station an IP based mobile communication system, including the steps of: a) receiving an "Activate PDP context Request" message including router solicitation from the mobile station; b) creating a link local address of the mobile station according to the router solicitation; c) acquiring a global IP address of the mobile station through cooperation with an Internet service provider (ISP) based on the created link local address; and d) loading the acquired global IP address in an "Activate PDP Context Accept" message and transferring the "Activate PDP Context Accept" message to the mobile station.

DESCRIPTION OF SPECIFIC EMBODIMENTS

An Internet Protocol (IP) based mobile communication system such as Internet Protocol Version 4 (IPv4) and IPv6, which can transfer data at a high-speed and provide diverse multimedia services, has been standardized in a current 3rd Generation Partnership Project (3GPP). The present invention relates to a method for dynamically allocating an IPv6 address to the mobile station through cooperation of a session management protocol and an Internet protocol of the mobile communication system in an IP based next generation mobile communication system.

That is, the dynamic Internet address configuration method through cooperation of the session management protocol and the Internet protocol can simplify a signal procedure, which is necessary in Internet address configuration of the mobile station, by allocating the Internet address to the mobile station through cooperation of the session management protocol procedure of the mobile communication system and an address allocation mechanism in the IPv6 based Internet. Therefore, the present invention can improve entire system performance by providing an IP mobility of the mobile station by being applied to the IPv6 based mobile communication system and reducing delay consumed in the session configuration of a user.

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 3:
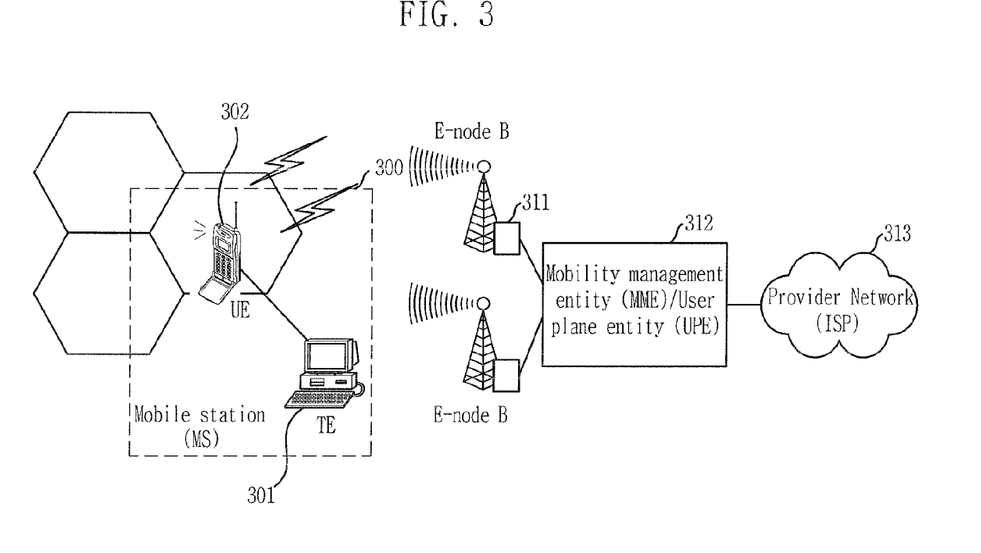
FIG. 3 shows a network of an Internet Protocol (IP) based next generation mobile communication system, e.g., 3GPP Evolution (3GE), where the present invention is applied.

FIG. 3 shows a network of an IP based next generation mobile communication system, e.g., 3GPP Evolution (3GE), where the present invention is applied.

A mobile station 300 has a function wirelessly accessing to a 3GE system and a data transfer protocol process function. The mobile station 300 provides a service to a user, or provides a service to a user through a terminal equipment (TE) 301 such as a personal computer. In this document, a function including a function of the user equipment 302 and a function of the terminal equipment 301 are considered as functions of the mobile station 300.

The 3GE system network includes an Evolved Node B (E-Node B) 311 and a Mobility Management Entity/User Plane Entity (MME/UPE) 312. The E-Node B 311 functions as a base station of the mobile communication system. Also, the E-Node B 311 performs a Radio Frequency (RF) receiving process function, a physical layer (PHY) function, a Media Access Control (MAC) function, and a Radio Resource Control (RRC) function for managing radio resources.

The MME/UPE 312 cooperates with a plurality of E-Nodes B 311 and performs mobility and session management functions of the 3GE mobile station. Also, the MME/UPE 312 operates by cooperating with a network of an operator for subscriber management and a session initiation protocol (SIP) based service.

Referring to FIG. 3, a session management (SM) protocol operates in the user equipment 302 and the MME/UPE 312, and performs service session configuration of a user and a management function of a packet data protocol (PDP) context. Therefore, a signal procedure for session management of the control plane is performed between the user equipment 302 and the MME/UPE 312 based on a control message for PDP management in the conventional 3GPP.

Figure 4:
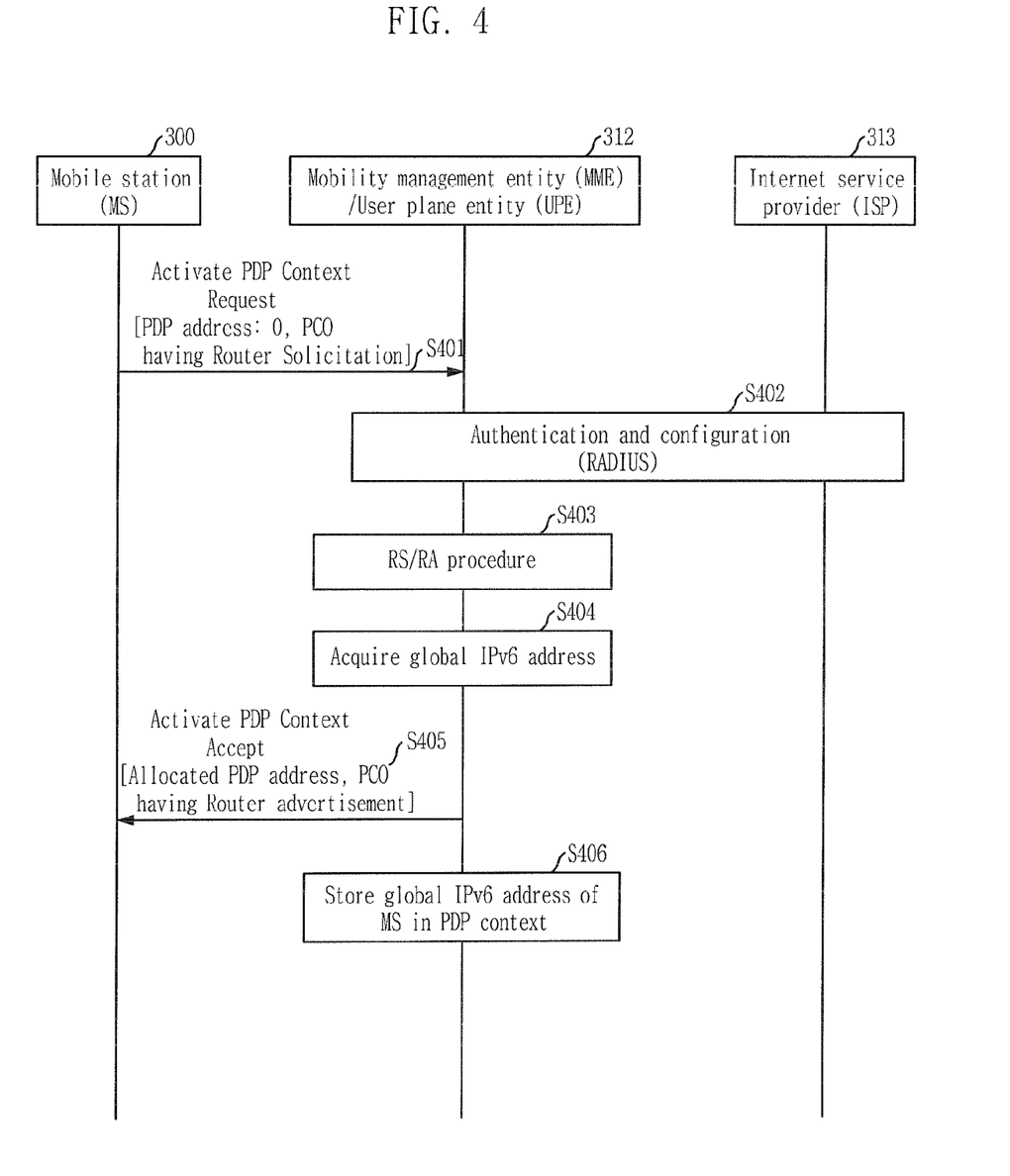
FIG. 4 is a flowchart describing a stateless dynamic address allocating method of the mobile station in the IP based mobile communication system in accordance with an embodiment of the present invention.
Figure 5:
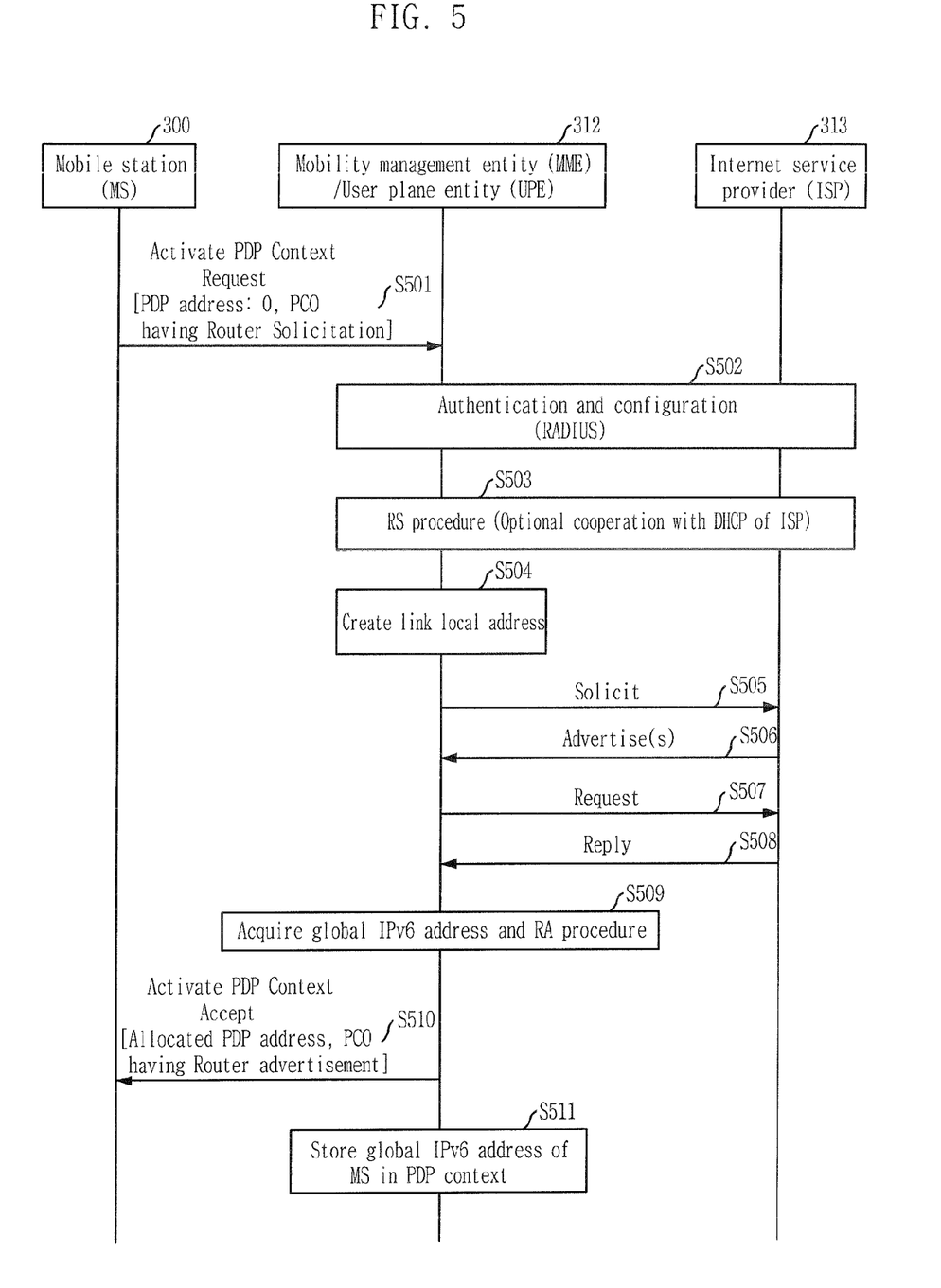
FIG. 5 is a flowchart describing a stateful dynamic address allocating method of the mobile station in the IP based mobile communication system in accordance with an embodiment of the present invention.

To have a look at the MME/UPE 312 related to IP address allocation with reference to FIGS. 4 and 5, the MME/UPE 312 in the 3GE system performs the session management function of the 3GE system and functions as an IP gateway. The MME and the UPE can be individually realized as a system, or another function block, i.e., different function media, inside a system.

Referring to the IP address allocation according to the present invention, the MME is a block for performing a session management function and the UPE is a block for functioning as an IP gateway. In the present invention, the MME as the session management block transfers the "Router Solicitation" message transferred from the mobile station to the UPE as the IP gateway block in order to allocate the IP address of the mobile station. Subsequently, the UPE transfers the "Router Advertisement" message to the MME. The "Router Solicitation" message and the "Router Advertisement" message use an interface defined between the MME and the UPE. That is, since the MME executes as the mobile station, router solicitation (RS)/router advertisement (RA) procedures between the MME and the UPE are performed at steps S403, S503, and S509.

FIG. 4 is a flowchart describing a stateless dynamic address allocating method of the mobile station in the IP based mobile communication system in accordance with an embodiment of the present invention. FIG. 4 shows a stateless IPv6 address allocation procedure performed in the MME/UPE 312. That is, FIG. 4 shows the stateless IPv6 address allocating procedure in case that the mobile station 300 configures an initial session in the 3GE system as shown in FIG. 3.

The present invention can reduce the number of message procedures transferred/received among function media and minimize resources consumption in the wireless section through cooperation of the control procedure of the control plane and the control procedure of the user plane in order to allocate the IPv6 address. The present invention performs the stateless IPv6 address allocation procedure through a detailed procedure.

In order to configure a session for the service requested by the user, the mobile station 300, i.e., the user equipment 302 of FIG. 3, creates and transfers an "Activate PDP Context Request" message to the MME/UPE 312 at step S401. Although FIG. 3 shows that the mobile station 300 directly transfers the "Activate PDP Context Request" message to the MME/UPE 312, the "Activate PDP Context Request" message may be transferred to the MME/UPE 312 through other media, e.g., an E-node B. This is also applied to the embodiment of FIG. 5.

The "Activate PDP Context Request" message suggested in the conventional 3GPP (Rel-6) is used and "PDP Address IE" is configured as "0" to request dynamic allocation of the IPv6 address. Also, information for router solicitation (see FIGS. 7A and 9A), i.e., a "Router Solicitation" message, and IPv6 address request indication (Refer to 901 of FIG. 9A) are added to information elements (IE) included in the "Activate PDP Context Request" message. Accordingly, the IP address auto configuration procedure performed in the user plane can be performed in the MME/UPE 312 after performing the PDP activation procedure.

The session management block of the MME/UPE 312 receiving the "Activate PDP Context Request" message from the mobile station 300 performs an authentication and configuration procedure for the stateless address auto-configuration procedure at step S402. The authentication and configuration procedure of the step S402 is an optionally applied procedure and the authentication procedure is performed through cooperation with a Remote Authentication Dial-In User Service (RADIUS) server.

When the authentication and configuration procedure of the step S402 is completed, the MME/UPE 312 allocates a global IPv6 address to be used by the mobile station 300 based on an Internet control message protocol (ICMP) message included in the received "Activate PDP Context Request" message.

The MME/UPE 312 performs a session management function of the 3GE system and functions as an IP gateway. As described in FIG. 3, the session management block denotes a function block of the MME and the IP gateway block denotes a function block of the UPE.

The session management block of the MME/UPE 312 transfers the "Router Solicitation" message included in the received "Activate PDP Context Request" message to the IP gateway block of the MME/UPE 312. Subsequently, the IP gateway block transfers the "Router Advertisement" message to the session management block. The IPv6 address of the mobile station 300 is allocated at step S403 through the RS/RA procedure described above.

The RS/RA procedure of the step S403 performed between the session management block of the MME and the IP gateway block of the UPE, and the global address acquisition procedure of the step S404 will be described in detail hereinafter.

The session management block of the MME/UPE 312 transfers the "Router Solicitation" message included in the "Activate PDP Context Request" message to the IP gateway block. Subsequently, the IP gateway block acquires an interface-ID and prefix information, creates a "Router Advertisement" message based on a source link address including the acquired interface-ID and prefix information, and transfers the created "Router Advertisement" message to the session management block at the step S403. The IP gateway block creates and transfers the global IPv6 address of the mobile station 300 to the session management block based on the acquired interface-ID and prefix information, thereby acquiring the global IPv6 address of the MME/UPE 312 at step S404.

The session management block of the MME/UPE 312 acquiring the global IPv6 address transfers the "Activate PDP Context Accept" message including the global IPv6 address to the mobile station 300 at step S405. A protocol configuration option (PCO) field of the "Activate PDP Context Accept" message transferred to the mobile station 300 includes the "Router Advertisement" message acquired by the session management block (Refer to FIGS. 7B and 9B) and IPv6 address response indication (Refer to 911 of FIG. 9B). The MME/UPE 312 stores the global IPv6 address in the PDP context at step S406 in order to transfer a downlink traffic to be transferred to the mobile station 300.

FIG. 5 is a flowchart describing a stateful dynamic address allocating method of the mobile station in the IP based mobile communication system in accordance with an embodiment of the present invention. FIG. 5 shows a procedure that the MME/UPE 312 allocates a dynamic address through cooperation with an Internet service provider (ISP) 313. That is, FIG. 5 shows a stateful address allocation procedure that the mobile station is performed in initial session configuration in the 3GE system as shown in FIG. 3.

The present invention has the control procedure of the control plane and the control procedure of the user plane cooperate in order to allocate the IPv6 address. Although the stateful IPv6 address allocating method is similar to the stateless IPv6 address allocating method, the stateful IPv6 address allocating method is different from the stateless IPv6 address allocating method in that the IPv6 address of the mobile station 300 is allocated based on the DHCP existing on the ISP 313. Therefore, the MME/UPE 312 functions as a DHCP client in order to allocate the IPv6 address of the mobile station 300 and acquires the IPv6 address of the mobile station 300 by cooperating with the DHCP server on the ISP.

Referring to FIG. 5, the stateful IPv6 address allocating method will be described in detail hereinafter.

In order to perform session configuration for a user service, the mobile station 300, i.e., the user equipment 302 of FIG. 3, transfers the "Activate PDP Context Request" message to the MME/UPE 312 at step S501.

The "Activate PDP Context Request" message uses the message suggested in the conventional 3GPP (Rel-6) and "PDP Address IE" is configured as "0" in order to request dynamic allocation of the IPv6 address. The "Router Solicitation" message (Refer to FIGS. 7A and 9A), which is information for router solicitation, and the IPv6 address request indication (Refer to FIG. 9A) are added to the information element included in the "Activate PDP Context Request" message. Accordingly, the IP address auto configuration procedure performed in the user plane after performing the PDP activation procedure can be performed in the MME/UPE 312.

The session management block of the MME/UPE 312 receiving the "Activate PDP Context Request" message performs an authentication procedure for the stateful IPv6 address auto configuration procedure, which is an optional procedure performed through cooperation with the RADIUS server, and the configuration procedure at step S502.

The session management block of the MME/UPE 312 transfers the "Router Solicitation" message included in the "Activate PDP Context Request" message to the IP gateway block of the MME/UPE 312. The IP gateway block of the MME/UPE 312 receiving the "Router Solicitation" message acquires the link local prefix and the interface-ID at step S503. The IP gateway block of the MME/UPE 312 creates a link local address of the mobile station 300 based on the acquired link local prefix and the interface-ID at step S504. The IP gateway block of the MME/UPE 312 cooperates with the ISP 313 based on the created link local address and this procedure will be described at steps 505 to 508.

The RS procedure of the step S503 and the link local address creation procedure of the step S504 will be described in detail hereinafter.

When the configuration procedure of the step S502 is completed, the session management block of the MME/UPE 312 extracts the "Router Solicitation" message from the "Activate PDP Context Request" message and transfers the "Router Solicitation" message to the IP gateway block. Accordingly, the IP gateway block acquires the interface-ID and the link local prefix, e.g., FE80::/64, and creates a link local IPv6 address based on the acquired information at step S504.

There are two procedures that the IP gateway block of the MME/UPE 312 acquires the link local prefix. First, the IP gateway block of the MME/UPE 312 acquires the link local prefix by using an internal prefix pool. Second, the IP gateway block of the MME/UPE 312 acquires the link local prefix through cooperation with the DHCP server of the ISP 313. That is, cooperating with the DHCP server is an optional procedure.

The MME/UPE 312 acquires the link local IPv6 address of the mobile station 300 requested through the PDP activation procedure by performing the RS procedure of the step S503 and the link local address creation procedure of the step S504. That is, when the authentication and configuration procedure of the step S502 is completed, the MME/UPE 312 creates the link local IPv6 address of the mobile station 300 based on the ICMP protocol message included in the "Activate PDP Context Request" message.

A procedure of acquiring a global IP address of the mobile station 300 based on the link local IPv6 address acquired through the router solicitation procedure of the step S503 and the link local address creation procedure of the step S504 will be described hereinafter.

The procedures of the step S505 to 508 are that the IP gateway block of the MME/UPE 312 performs the DHCP procedure through cooperation with the DHCP server of the ISP 313 based on the link local IPv6 address and acquires a stateful IPv6 address, i.e., the global IP address, through the DHCP procedure. To be specific, the IP gateway block of the MME/UPE 312 requests the DHCP procedure by transferring the "Solicit" message to the DHCP server through cooperation with the session management block at step S505. The "Solicit" message is a message that the DHCP client transfers from the IP gateway block to all DHCP relay agents and DHCP servers in order to find the DHCP server.

The DHCP server receiving the "Solicit" message from the IP gateway block transfers the "Advertisement" message meaning that the DHCP server can operate as the DHCP server to the IP gateway block at step S506. The "Advertisement" message may be transferred from a plurality of DHCP servers and a specific DHCP server is selected according to decision of the IP gateway block of the MME/UPE 312.

The IP gateway block of the MME/UPE 312 receiving the "Advertisement" message transfers the "Solicit" message to the DHCP server selected in the step 506 in order to request the IPv6 address, i.e., the global IP address, and the configuration information at step S507. The DHCP server receiving the "Request" message transfers a "Reply" message including the allocated IPv6 address and the configuration information, i.e., the global prefix information, to the IP gateway block at step S508.

The IP gateway block of the MME/UPE 312 acquires the global IP address and configuration information from the received "Reply" message, creates a "Router Advertisement" message, i.e., a response message with respect to the "Router Solicitation" message of the step S503, based on the acquired information, and transfers the "Router Advertisement" message to the session management block of the MME/UPE 312 at step S509. The "Router Advertisement" message includes the source link address including the interface-ID acquired at the step S503.

When the global IP address is acquired and the router advertisement (RA) procedure is performed at step S509, the session management block of the MME/UPE 312 transfers the PDP address IE of the "Activate PDP Context Accept" message loading the global IPv6 address allocated to the mobile station 300 to the mobile station 300 through the steps 505 to 508 at step S510. Accordingly, the IPv6 address allocating procedure of the mobile station (MS) ends. The PCO field of the "Activate PDP Context Accept" message includes the "Router Advertisement" message (Refer to FIGS. 7B and 9B) and IPv6 address response indication (Refer to 911 of FIG. 9B). The MME/UPE 312 stores the allocated global IPv6 address of the mobile station to the PDP context to transfer down link data at step S511.

Figure 6A:
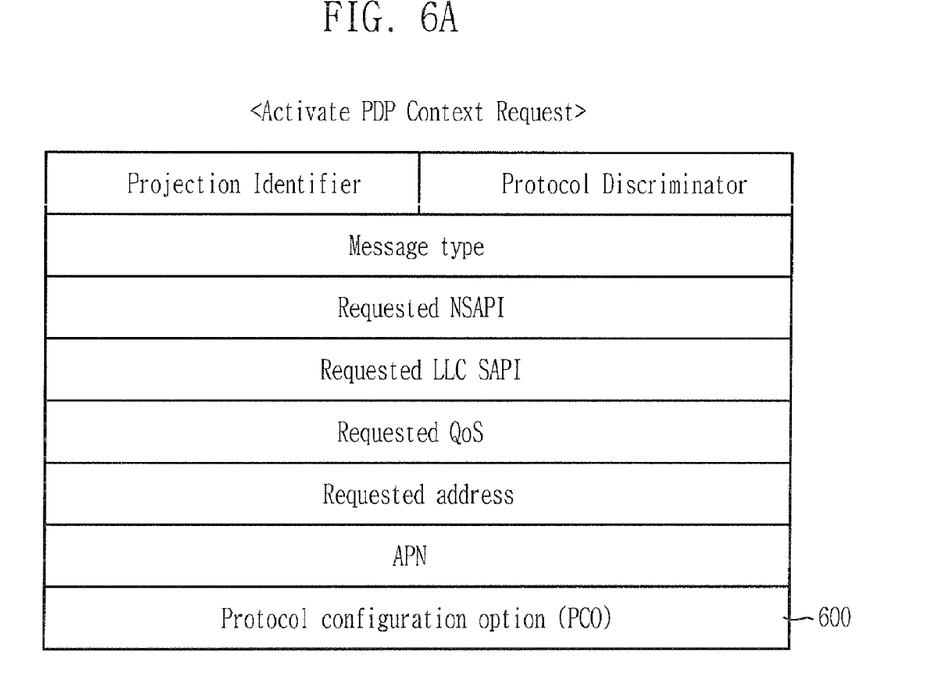
FIG. 6A shows an "Activate PDP Context Request" message suggested in the 3GE system in accordance with an embodiment of the present invention.

FIG. 6A shows an "Activate PDP Context Request" message suggested in the 3GE system in accordance with an embodiment of the present invention.

The "Activate PDP Context Request" message is a message for activating the PDP context and configuring a service session between the mobile station and a core network. The "Activate PDP Context Request" message includes parameters such as a transaction ID, a protocol discriminator, a message type, requested NSAPI, requested LLC SAPI, requested service QoS, a requested PDIP address, Access Point Name (APN), and a protocol configuration option (PCO) 600 for service.

In order to perform the PDP activation procedure, the present invention encapsulates and adds a "Router Solicitation" message (Refer to FIG. 7A) to the PCO field 600 inside the "Activate PDP context Request" message having a structure as shown in FIG. 6A. That is, the structure of the "Activate PDP Context Request" message is extended in a format that the conventional PCO IE 600 can accept the "Router Solicitation" message (Refer to FIG. 7A) suggested in the RFC 2461.

Figure 6B:
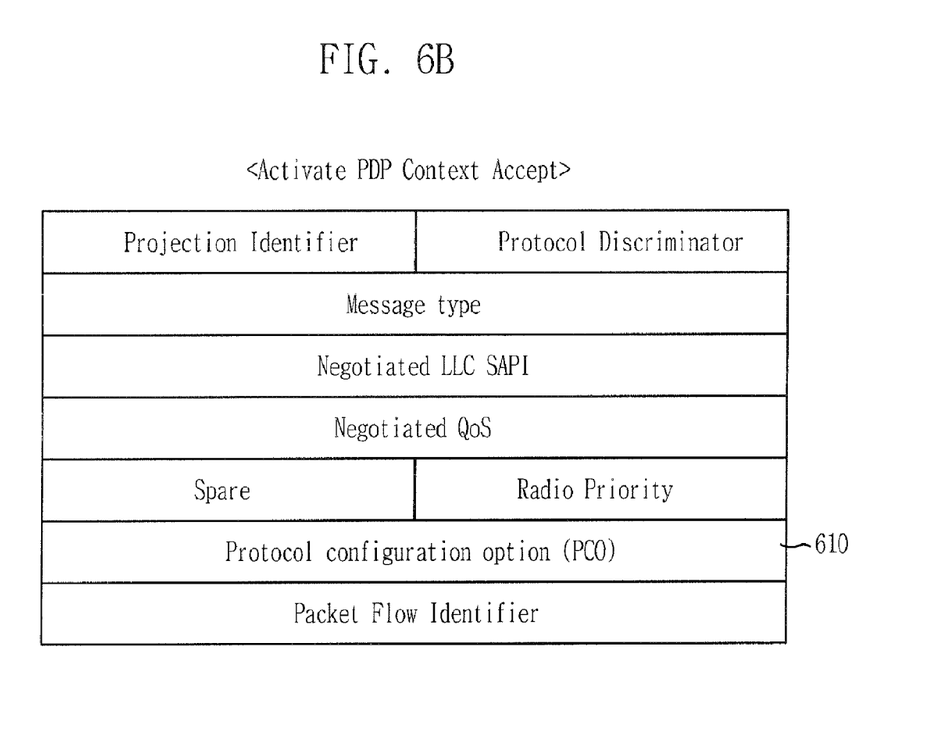
FIG. 6B shows an "Activate PDP Context Accept" message suggested in the 3GE system in accordance with the embodiment of the present invention.

FIG. 6B shows an "Activate PDP Context Accept" message suggested in the 3GE system in accordance with the embodiment of the present invention.

Referring to FIG. 6B, the "Activate PDP Context Accept" message includes parameters such as a transaction ID, a protocol discriminator, a message type, negotiated LLC SAPI, negotiated service QoS, a radio priority, a PDIP address, a protocol configuration option (PCO) 610, and a packet flow ID. In particular, in order to perform the PDP activation procedure, the present invention encapsulates and adds a "Router Advertisement" message (Refer to FIG. 7B) to the PCO field 610 inside the "Activate PDP Context Accept" message having the structure as shown in FIG. 6B. That is, the structure of the "Activate PDP Context Accept" message is extended in a format that the conventional PCO IE 610 can accept the "Router Advertisement" message (Refer to FIG. 7B) in the RFC 2461.

Figure 7A:
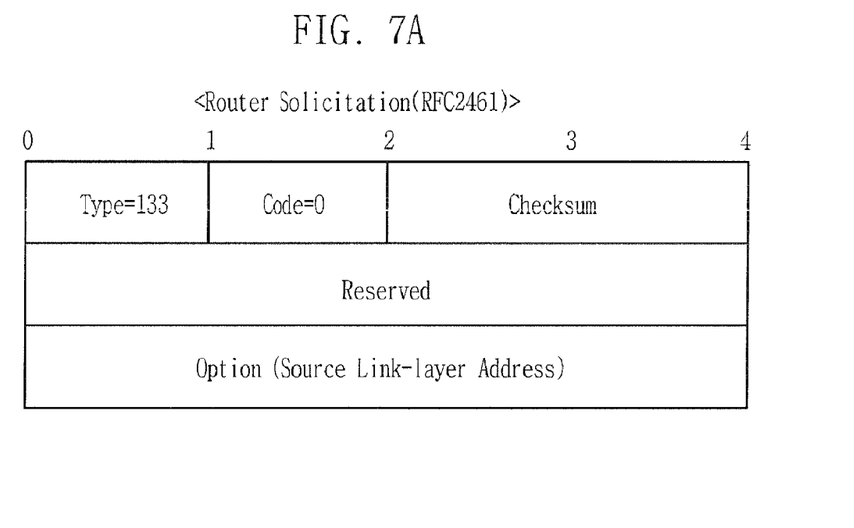
FIG. 7A shows the "Router Solicitation" message suggested in the RFC 2461 in accordance with an embodiment of the present invention.
Figure 7B:
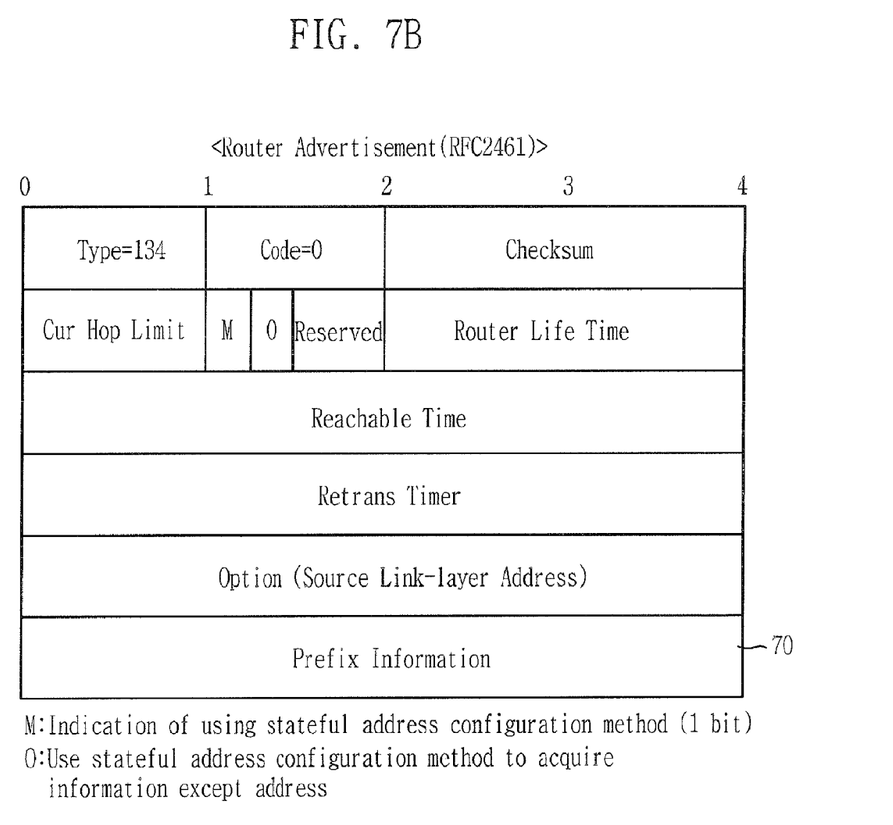
FIG. 7B shows the "Router Advertisement" message suggested in the RFC 2461 in accordance with the embodiment of the present invention.

FIG. 7A shows the "Router Solicitation" message suggested in the RFC 2461 in accordance with an embodiment of the present invention. FIG. 7B shows the "Router Advertisement" message suggested in the RFC 2461 in accordance with the embodiment of the present invention.

Referring to FIGS. 7A and 7B, the "Router Solicitation" message suggested in the RFC 2461 includes a message type, a check sum for correcting an error, and a source link-layer address. The source link address corresponds to ID information of the mobile station 300.

The "Router Advertisement" message suggested in RFC 2461 includes a message type, cur hop limit, check sum for correcting an error, a router lifetime, a reachable time, a retransmission timer, a source link-layer address, and prefix information. The source link address corresponds to ID information of the mobile station 300 and is transferred through the "Router Solicitation" message. When an M field is configured in the "Router Advertisement" message, the mobile station figures out that the address allocation is stateful IPv address allocation. A prefix information field 70 is a non-included option field.

Figure 8:
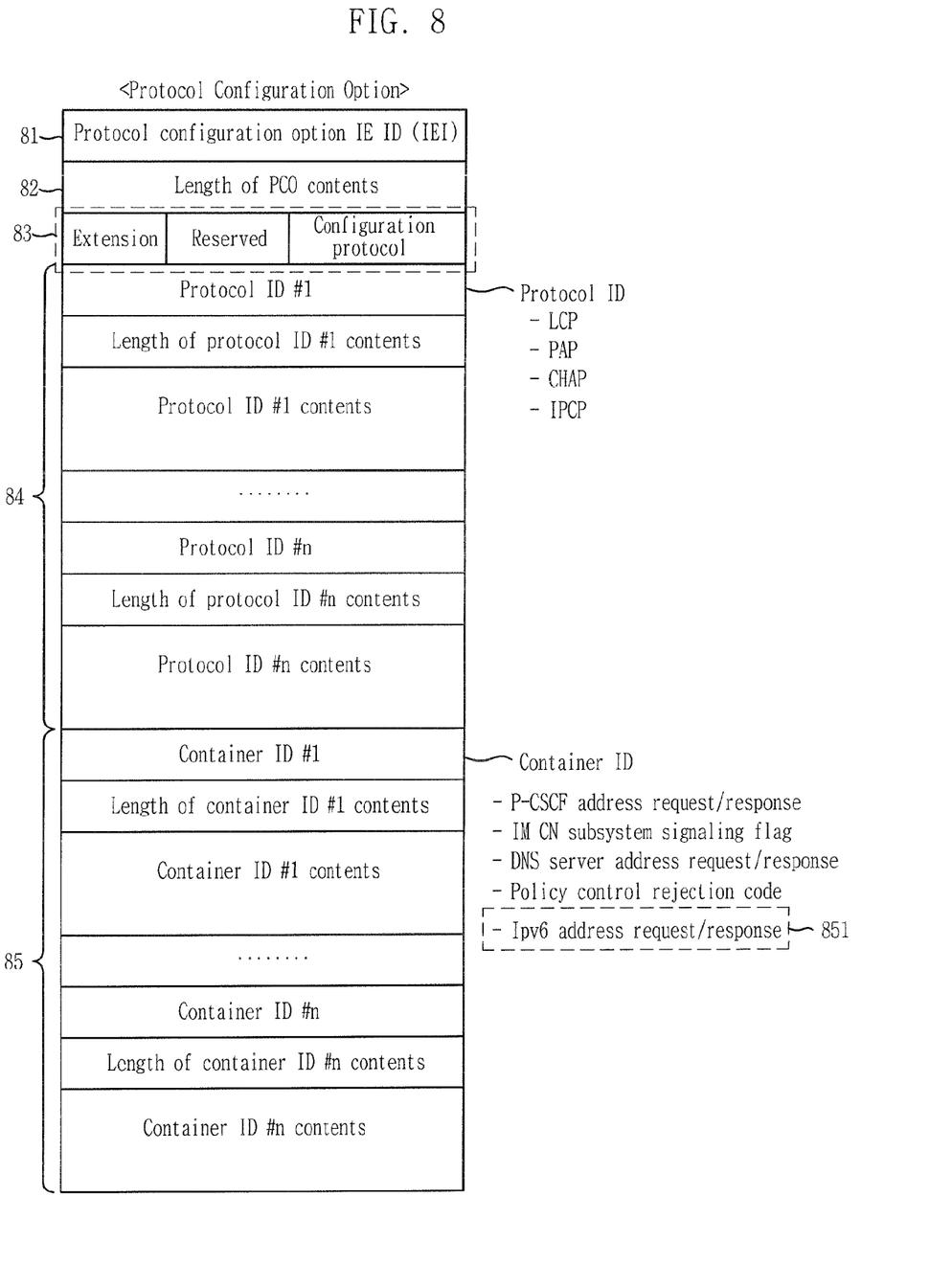
FIG. 8 shows a protocol configuration option (PCO) field which is modified according to the present invention.

FIG. 8 shows a protocol configuration option (PCO) field which is modified according to the present invention.

Referring to FIG. 8, the protocol configuration information field includes a PCO information element identifier (IEI) 81, a PCO contents length 82, and protocol configuration information 83, and additionally includes a PCO list 84 and an additional parameter list 85. The PCO list 84 is a part showing contents of the PCO, and includes a protocol ID, a length of the protocol contents, and the protocol contents. In particular, the protocol ID defines LCP, PAP, CHAP, and IPCP according to each ID value.

The additional parameter list 85 is a part including values which needs to be transferred between the mobile station and the network, and includes a container ID, a length of the container contents, and the container contents. In particular, the container ID defines P-CSCF address request/response, IM CN subsystem signaling flag, DNS server address request/response, a policy control rejection code, and IPv6 address request/response 851 according to each ID value. The IPv6 address request/response 851 is newly defined according to the present invention. The "IPv6 Address Request" is an indication notifying that the IP address having an IPv6 address system is requested. The "IPv6 Address Request" is stored in the PCO 600 of the "Activate PDP Context Request" message. The "IPv6 Address Response" is an indication notifying that the IP address having the IPv6 address system is allocated. The "IPv6 Address Response" is stored in the PCO 610 of the "Activate PDP Context Accept" message.

Figure 9A:
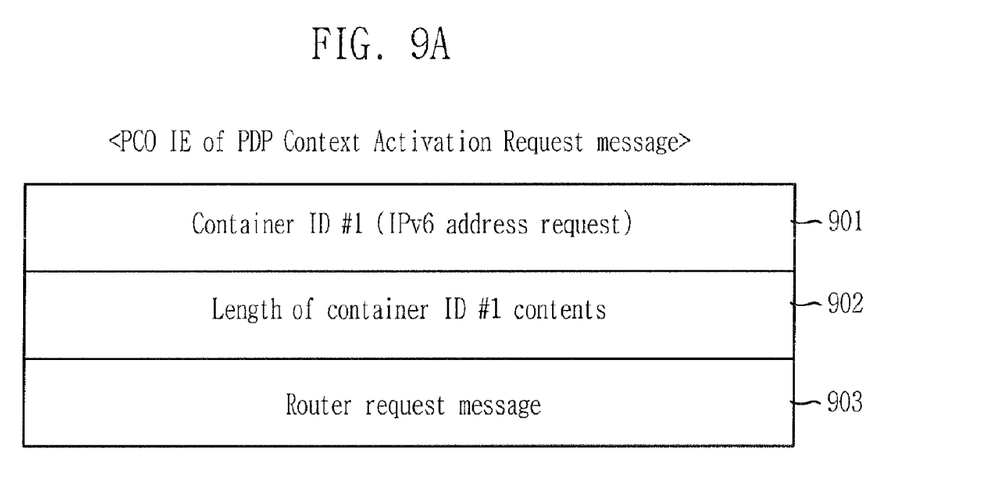
FIG. 9A shows an information entity for transferring router solicitation information through the PCO IE of the "Activate PDP Context Request" message of FIG. 6A.

FIG. 9A shows an information entity for transferring router solicitation information through the PCO IE of the "Activate PDP Context Request" message of FIG. 6A.

Referring to FIG. 9A, the PCO field 600 of the "Activate PDP Context Request" message includes information elements such as a container ID 901 meaning the IPv6 address request, a contents length 902, and a "Router Solicitation" message 903 corresponding to the contents (Refer to FIG. 7A). The information element denotes ICMP information transferred from the mobile station of the user. That is, the indication of requesting the IPv6 address is defined through the container ID 901 and the "Router Solicitation" message of FIG. 7A is stored in the container contents field.

Figure 9B:
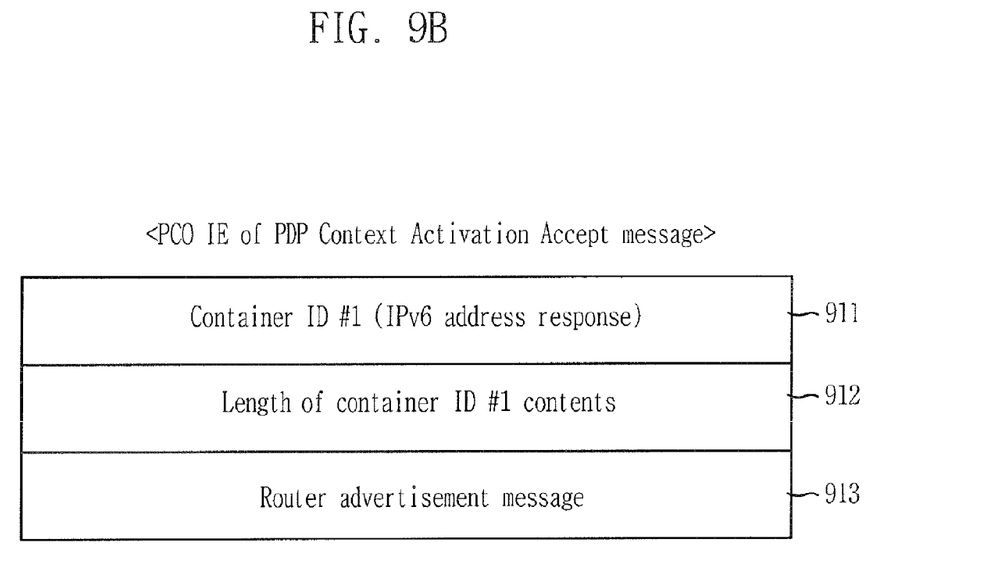
FIG. 9B shows an information entity for transferring router advertisement information through the PCO IE of the "Activate PDP Context Accept" message of FIG. 6B.

FIG. 9B shows an information entity for transferring router advertisement information through the PCO IE of the "Activate PDP Context Accept" message of FIG. 6B.

Referring to FIG. 9B, the PCO field 610 of the "Activate PDP Context Accept" message includes information elements such as a container ID 911 meaning the IPv6 address request/response 851, a contents length 912, and a router advertisement message 913 corresponding to the contents (Refer to FIG. 7B). The information elements mean ICMP information transferred to the mobile station of the user. That is, the indication of allocating the IPv6 address is defined through the container ID 911 and the "Router Advertisement" message of FIG. 7B is stored in the container contents field.

As described above, the present invention can solve the problems of the procedure complexity and the process delay occurring in the conventional method, which individually processes the signal procedure of the control plane and the IP protocol control procedure of the user plane, by allocating the IPv6 address of the mobile station through cooperation between the signal procedure of the control plane and the IP protocol control procedure of the user plane in the IP based next generation mobile communication system.

That is, the present invention can reduce the number of signaling procedures for allocating the IPv6 address and decreases entire delays by cooperating the control plane procedure and the user plane procedure in the IP based next generation mobile communication system. In particular, when the 3GE mobile station using the IPv6 moves, delay consumed to acquire an IPv6 address can be minimized.

Also, the present invention can simplify the signal procedure through the radio section by performing a proxy function for IPv6 address acquisition of the MME/UPE. In particular, when the stateful IPv6 address is allocated, a cost for transferring and processing a message can be minimized by excluding the PDP modification procedure generated after the DHCP procedure.

As described above, the technology of the present invention can be realized as a program. A code and a code segment forming the program can be easily inferred from a computer programmer of the related field. Also, the realized program is stored in a computer-readable recording medium, i.e., an information storing medium, and is read and operated by the computer, thereby realizing the method of the present invention. The recording medium includes all types of recording media which can be read by the computer.

While the present invention has been described with respect to the specific embodiments, it will be apparent to those skilled in the art that various changes and modifications may be made without departing from the spirit and scope of the invention as defined in the following claims.

What is claimed is:

1. A method for allocating a stateless dynamic Internet protocol (IP) address to a mobile station in an IP based mobile communication system, comprising the steps of:
    a) receiving an "Activate Packet Data Protocol (PDP) request" message including router solicitation from the mobile station;
    b) acquiring a global IP address of the mobile station by performing the router solicitation and a router advertisement procedure instead of the mobile station; and
    c) loading the acquired global IP address in an "Activate PDP context Accept" message and transferring the "Activate PDP context Accept" message to the mobile station.

2. The method of claim 1, further comprising the step of:
    d) storing the acquired global IP address in the PDP context in order to transfer a downlink traffic on the mobile station.

3. The method of claim 1, wherein the "Activate PDP context Request" message stores an indication notifying that an IP address having a specific address system is requested, which is an IP address request indication of a specific format, and a "Router Solicitation" message.

4. The method of claim 3, wherein the IP address request indication of the specific format is defined through a container identifier (ID) and the "Router Solicitation" message is stored in the container contents field.

5. The method of claim 1, wherein in the step b), the global IP address of the mobile station is acquired through router solicitation and router advertisement procedures between Mobility Management Entity (MME) and User Plane Entity (UPE).

6. The method of claim 5, wherein the step b) includes the steps of:
    b1) transferring the "Router Solicitation" message included in the "Activate PDP context Request" message from the MME to the UPE;
    b2) acquiring an interface-ID and prefix information in the UPE; and
    b3) creating a router "Advertisement" message and a global IP address of the mobile station based on the acquired interface-ID(ID) and prefix information in the UPE, and transferring the router "Advertisement" message and the global IP address from the UPE to the MME.

7. The method of claim 6, wherein the "Activate PDP Context Accept" message stores the global IP address in the PDIP address field and stores an indication notifying that the IP address having the specific address is allocated, which is an IP address response indication of a specific format, and the router "Advertisement" message in the PCO field.

8. The method of claim 7, wherein the IP address response indication of the specific format is defined through the container ID and the router "Advertisement" message is stored in the container contents field.

9. A method for allocating a stateful dynamic IP address to a mobile station an Internet protocol (IP) based mobile communication system, comprising the steps of:
    a) receiving an "Activate Packet Data Protocol (PDP) context Request" message including router solicitation from the mobile station;
    b) creating a link local address of the mobile station according to the router solicitation;
    c) acquiring a global IP address of the mobile station through cooperation with an Internet service provider (ISP) based on the created link local address; and
    d) loading the acquired global IP address in an "Activate PDP Context Accept" message and transferring the "Activate PDP Context Accept" message to the mobile station.

10. The method of claim 9, further comprising the step of:
    e) storing the acquired global IP address in a PDP context in order to transfer a downlink traffic on the mobile station.

11. The method of claim 9, wherein the step b) includes the steps of:
- b1) transferring a "Router Solicitation" message included in the "Activate PDP context Request" message from Mobility Management Entity (MME) to User Plane Entity (UPE);
- b2) acquiring a link local prefix and interface identification (interface-ID) in the UPE; and
- b3) creating a link local address of the mobile station based on the acquired link local prefix and interface-ID in the UPE.

12. The method of claim 11, wherein the link local prefix is acquired through cooperation with a dynamic host configuration protocol (DHCP) server of the Internet service provider, or is acquired by using a prefix pool of the UPE.

13. The method of claim 9, wherein the "Activate PDP context Request" message stores an indication notifying that an IP address having a specific address system is requested, which is an IP address request indication of a specific format, and the "Router Solicitation" message.

14. The method of claim 13, wherein the IP address request indication of the specific format is defined through a container identifier (ID) and the "Router Solicitation" message is stored in the container contents field.

15. The method of claim 9, wherein in the step c), a DHCP procedure is performed through cooperation with the DHCP server of the ISP based on the link local address and the global IP address of the mobile station is acquired from the DHCP server through the DHCP procedure.

16. The method of claim 15, further comprising the steps of:
- f) acquiring a global prefix from the DHCP server through cooperation with the DHCP server of the ISP based on the link local address; and
- g) creating a router "Advertisement" message including the acquired global prefix.

17. The method of claim 16, wherein the "Activate PDP Context Accept" message stores the acquired global IP address in the PDIP address field and stores an indication notifying that an IP address having a specific address system is allocated, and the router "Advertisement" message in a Protocol Configuration Option (PCO) field.

18. The method of claim 17, wherein the IP address response indication of the specific format is defined through the container ID and the router "Advertisement" message is stored in the container contents field.

* * * * *